(12) United States Patent
Gelderie et al.

(10) Patent No.: US 8,491,961 B2
(45) Date of Patent: Jul. 23, 2013

(54) PROTECTIVE ELEMENT AND METHOD FOR THE PRODUCTION THEREOF

(75) Inventors: Udo Gelderie, Wurselen (DE); Norbert Schwankhaus, Baesweiler (DE)

(73) Assignee: Vetrotech Saint-Gobain (International) AG, Flamatt (CH)

( * ) Notice: Subject to any disclaimer, the term of this patent is extended or adjusted under 35 U.S.C. 154(b) by 0 days.

(21) Appl. No.: 13/516,831

(22) PCT Filed: Dec. 20, 2010

(86) PCT No.: PCT/CH2010/000316
§ 371 (c)(1),
(2), (4) Date: Sep. 4, 2012

(87) PCT Pub. No.: WO2011/075857
PCT Pub. Date: Jun. 30, 2011

(65) Prior Publication Data
US 2012/0321901 A1    Dec. 20, 2012

(30) Foreign Application Priority Data
Dec. 21, 2009 (CH) ........................ 1962/09

(51) Int. Cl.
    *B05D 3/02*      (2006.01)
    *B32B 17/00*      (2006.01)
(52) U.S. Cl.
    CPC .............. *B05D 3/02* (2013.01); *B05D 2203/35* (2013.01); *B05D 2601/22* (2013.01); *B32B 17/00* (2013.01)
    USPC .................. 427/230; 427/387; 427/389.7

(58) Field of Classification Search
CPC ..... B05D 3/02; B05D 2203/35; B05D 2601/22
USPC .............. 427/223, 224, 230, 243, 352, 372.2, 427/387, 389.7; 106/15.05, 18.11, 18.12; 428/613, 621, 641, 411.1, 446–448, 450; 528/10–43
See application file for complete search history.

(56) References Cited

U.S. PATENT DOCUMENTS
6,159,606 A * 12/2000 Gelderie et al. .............. 428/426

FOREIGN PATENT DOCUMENTS
| DE | 37 40 330 A1 | * | 6/1988 |
| DE | 3740330 | | 6/1988 |
| EP | 0 620 781 B1 | * | 5/1999 |
| EP | 0620781 | | 5/1999 |
| WO | 02/100636 | | 12/2002 |
| WO | WO 02/100636 A1 | * | 12/2002 |
| WO | 2007/118887 | | 10/2007 |
| WO | WO 2007/118887 A1 | * | 10/2007 |

* cited by examiner

*Primary Examiner* — William Phillip Fletcher, III
(74) *Attorney, Agent, or Firm* — Rankin, Hill & Clark LLP

(57) ABSTRACT

A method for producing a protective element including the following steps is provided: mixing an aqueous, curable alkali silicate solution with silicon dioxide nanoparticles to form a filler having a first water content; performing thin-film evaporation of part of the water of the filler until the filler has a second water content that is less than the first water content, wherein the filler is flowable at the second water content; pouring the filler having the second water content into an intermediate space between two transparent substrate elements; and curing the filling mass in the intermediate space between the substrate elements while maintaining the second water content.

13 Claims, 1 Drawing Sheet

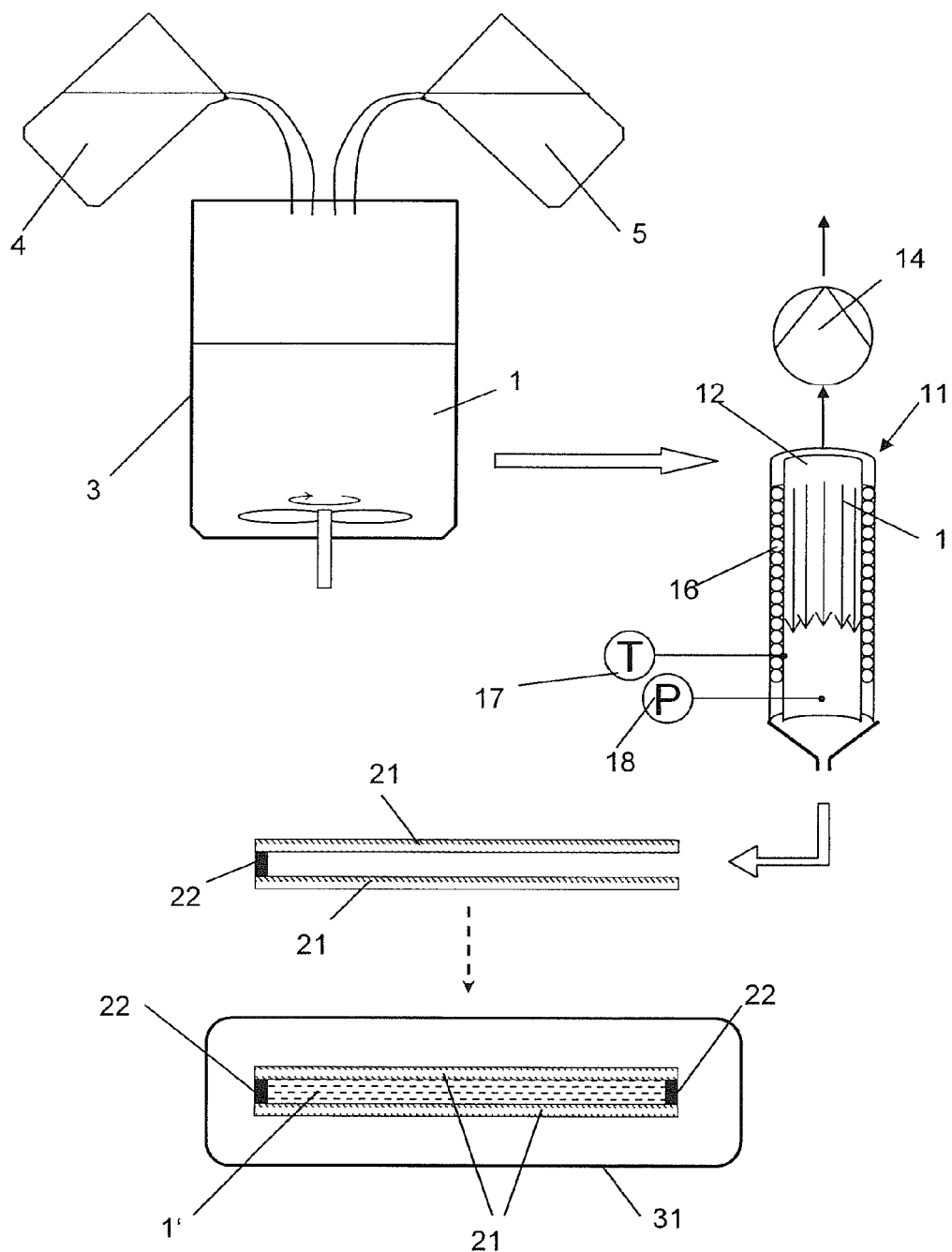

PROTECTIVE ELEMENT AND METHOD FOR THE PRODUCTION THEREOF

BACKGROUND OF THE INVENTION

1. Field of the Invention

The invention relates to a translucent protective element having at least two support elements, for example glass plates, and an intumescent fire protection layer in an intermediate space between the support elements.

2. Description of Related Art

Such protective elements are known, for example, from EP 0 620 781. The fire protection layer taught in this document is an aqueous alkali metal silicate which is produced by hardening of a water-containing filler composition composed of an alkali metal silicate and a hardener to form a polysilicate. The polysilicate has a molar ratio of silicon dioxide to alkali metal oxide of at least 4:1. The fully hardened fire protection layer contains essentially all the water of the water-containing filler composition due to hardening taking place in the sealed intermediate space between the support elements. The water content is in the range from 44 to 60 percent by weight. The heat protection element produced in this way has excellent fire protection properties and can be produced in a rational process.

An alternative process for producing a fire protection layer is known, for example, from FR 2 607 491 or from WO 2007/118887. This alternative process provides for an alkali metal silicate layer to be poured in the liquid state onto a glass plate and subsequently be dried, with the fire protection layer remaining on the glass plate during use and in the final state having a comparatively low water content in the range from, for example, 22% to 35% (% by weight). The second glass plate is adhesively bonded to the fire protection layer after the drying process. The alternative process has the disadvantage that the physical drying process takes a long time, which makes production of the heat protection element considerably more expensive.

Fire protection layers, according to the prior art, thus generally have a relatively high liquid content, which can result in the fire protection layer having a residual flowability. Reducing the water content of the starting materials for mixing of the filler composition, i.e. the use of more highly concentrated raw materials, is often not feasible since solutions collapse at an excessively high solids content and precipitates occur. This applies, for example, to potassium silicate and silica sol or to potassium hydroxide and a slurry of pyrogenic silica. Degassing the filler composition in the mixing vessel, which also results in water being given off, before introduction into the intermediate space is also known from EP 0 620 781 or EP 1 399 314. However, the amount of water which can be taken off in this way is very small since the filler composition must not be heated in the mixing vessel and exposed to the evaporation process to such an extent or time that hardening commences or proceeds too far. After introduction into the intermediate space, virtually no more water can be removed because the intermediate space has to be hermetically sealed during the chemical hardening of the silicate composition.

BRIEF SUMMARY OF THE INVENTION

It is an object of the invention to provide a heat protection element and a process for the production thereof which overcomes the disadvantages of the prior art and allows, in an efficient production process, the synthesis of a fire protection composition which has good fire protection properties.

This object is achieved by the invention as defined in the claims.

According to one aspect of the invention, a method for producing a fire protection element is provided, which comprises the following steps:

mixing of an aqueous, hardenable alkali metal silicate solution with silicon dioxide nanoparticles to give a filler composition having a first water content;

thin film evaporating of part of the water of the filler composition until the filler composition has a second water content which is lower than the first water content, with the filler composition being flowable at the second water content;

introducing the filler composition having the second water content into an intermediate space between two transparent support elements;

hardening of the filler composition in the intermediate space between the support elements while maintaining the second water content, is made available.

This approach is based firstly on the surprising recognition that the water content can be substantially reduced in a thin film evaporation process without there being the dilemma known from the prior art that a relatively high reduction in the water content is associated, due to the relatively high temperatures and/or operating times, with accelerated hardening and, therefore, is only practicable in insignificant amounts without the flowability being restricted too much. It has likewise been found that no precipitation takes place in the case of substantial amounts of water being vaporized, as would have to be feared in the case of colloids and/or siliceous mixtures, but instead the homogeneity and the flow properties can be retained.

The thin film evaporation is also referred to as "thin layer evaporation" or as "falling film evaporation". Appropriate apparatuses can be obtained in various designs. Thin film evaporation is known per se as a mild thermal separation method in distillation processes for the chemical industry, pharmacy and food processing. In thin film evaporators, the crude product is, in a continuous process, conveyed as a thin film along a generally heated wall in a downward direction. This occurs under conditions under which the volatile component evaporates. For example, evaporation can occur in an atmosphere having a reduced pressure. The wall can, for example, be a wall of an externally heated tube along whose interior surface the crude product is conveyed. In apparatuses according to the prior art, the gas saturated with the volatile component (the vapor) is subsequently condensed on a condenser in order to obtain the distillate.

Thin film evaporation, for a method according to the invention, likewise takes place by the starting filler composition (i.e. the filler composition before the removal of liquid) being applied to a, for example, heated wall. During application, the filler composition is preferably distributed across an upper side of the wall, for example using mechanical means such as wipers. Due to gravity, the filler composition then flows downward along the wall in an environment under reduced pressure and the resulting liquid-reduced filler composition flows out at the bottom. The liquid-reduced filler composition is subsequently introduced into the intermediate space between the support elements.

The heated wall can be an interior wall of a, for example, heated tube. The temperature of the wall can range from room temperature (20° C.) to 70° C., preferably from 25° C. to 45° C., for example from 28° C. to 42° C. or from 30° C. to 40° C. The pressure is, for example, not more than 350 mbar, in the range from 0.01 mbar to 310 mbar, from 0.01 mbar to 200 mbar or from 1 mbar to 100 mbar (depending on the apparatus available), preferably in the range from 2 mbar to 70 mbar, for example from 10 mbar to 50 mbar. In general, a reduction in the temperature is possible as a result of lowering the pressure. This makes settings in a wide pressure-temperature range possible, with the known physical correlations applying. The vapor is not required. It can be given off to the outside or the moisture in the vapor can, for example, be condensed out in order to recover heat, with the condensate being able to be discarded.

A second surprising discovery is that highly concentrated alkali metal silicate filler compositions can be chemically hardened even when the water content is reduced by, for example, up to 8% (in the present text the water content is specified in percent by weight) or more compared to the original water content by means of the thin film evaporator technology without turbidity or precipitation being observed in the fire protection layer in the final state.

A third discovery is that even at a reduced water content of, for example, from 33% to 42%, preferably from 35% to 40%, the fire protection properties of the poly-alkali metal silicate fire protection layer are very good. The lower cooling effect due to the heat of vaporization of the water compared to fire protection layers having a higher water content can often be at least partly compensated by the foam structure on foaming of the fire protection layer being different than at a higher water content. In particular, the foam structure can be finer than at a higher water content, which can mean an improved insulating effect.

In the process of the invention, the thin film evaporation takes place, as is known per se from distillation processes, in a continuous process in which the filler composition is allowed to run down along a previously heated outer wall of the column.

In the thin film evaporation, it is possible to apply a vacuum so that a large amount of liquid can be removed at comparatively low temperatures without a chemical reaction being accelerated too much. The viscosity of the filler composition having the second water content can remain relatively low because the hardening process commences to only an insignificant extent during thin film evaporation thanks to the low temperatures.

The reduction in the water content by means of thin film evaporation, i.e. the difference between the first water content and the second water content, is, for example, in the range from 3% to 10%, in particular from 5% to 8%.

In embodiments, a filler composition as disclosed in EP 0 620 781 is used as starting filler composition (before thin film evaporation) in the method according to the invention. The ratios of amounts and examples disclosed in this document are hereby explicitly incorporated by reference; these can be employed as starting filler compositions for the present invention.

According to alternative embodiments, the starting filler composition is produced by mixing alkali metal hydroxide, for example potassium hydroxide, with a colloid comprising $SiO_2$ nanoparticles. The colloid can be a silica sol. However, slurries of pyrogenic $SiO_2$ in a water-containing liquid are likewise possible.

In embodiments of the invention, the starting filler composition is produced by mixing potassium silicate (water glass) and/or potassium hydroxide with $SiO_2$ particles (provided in the form of silica sols and/or pyrogenic $SiO_2$ suspended in water), with the molar ratio of silicon dioxide $SiO_2$ to potassium oxide $K_2O$ (modulus) in the filler composition being at least 4:1. In place of potassium silicate, it is also possible to use a sodium silicate, a lithium silicate or a mixture of potassium, sodium and/or lithium silicates, with the modulus in these cases, too, preferably being at least 4:1.

A fire protection element according to the invention has, besides the filler composition, the support elements (for example two or more parallel glass plates) and the means of sealing the peripheral. Such means are known per se, and reference may be made, for example, to WO 03/031173 and the process described therein and the means described therein. In particular, such means can have a strand which runs around the periphery and maintains the spacing between the plates and is, for example, thermoplastic and/or elastomeric. In embodiments, a peripheral seal has, adjacent to one another, a peripheral strand which maintains the spacing and a peripheral, sealing strand, in each case between the glass plates.

In embodiments, a spacer composed of a thermoplastic and/or elastomeric material is applied by means of an extrusion machine to the peripheral region, i.e. a prefabricated strip is not used.

In alternative embodiments, a prefabricated strip, for example a butyl strip with or without a rubber/polymer inner core (Novalastik strip), is used.

Prestressed glass plates and/or coated glass plates are particularly advantageous as support elements. Thus, for example, at least one of the glass plates can be prestressed, for example thermally prestressed. In addition or as an alternative, at least one of the glass plates can have at least one coated surface.

The combination using prestressed glass plates is advantageous because their particularly good heat resistance interacts optimally with the fire protection property of the intumescent polysilicate composition; however, glass plates which are not prestressed or other generally transparent support elements can also be used.

Coated glass plates can be provided with coatings known per se, for example in order to reduce the transmitted heat radiation and/or primer layers to optimize the adhesion properties of glass plate and fire protection composition, which reinforce the fire protection properties and/or have other advantageous effects.

BRIEF DESCRIPTION OF THE DRAWINGS

Embodiments of the invention are described in further details and with the aid of a FIGURE in the following, wherein FIG. 1 shows a scheme outlining the course of the method of the invention.

DETAILED DESCRIPTION OF THE INVENTION

In the method illustrated in FIG. 1, the starting filler composition 1 is, as is known per se, initially obtained by combining its components 4, 5 in a mixing vessel 3 and, if necessary, mixed well by means of suitable mechanical means. The components 4, 5 can be an alkali metal silicate or an alkali metal hydroxide solution and a colloid or a suspension containing silicon dioxide particles. The composition of the components and the mixing ratio are selected so that the molar ratio of silicon dioxide:alkali metal oxide is in the range from 4 to 7 and the water content of the mixture is in the range from 40% to 60%.

The filler composition produced by mixing is subsequently conveyed without a substantial time delay into the thin film evaporator 11. This can be configured in a manner known per se for distillation vaporizers for operation under mild conditions.

The starting filler composition 1 is applied to the interior wall 12 of the inner tube, with uniform distribution in the circumferential direction being ensured by means of one or more wipers, (for example circumferential wiping rollers as known per se for thin film evaporators; not shown). Drawn by gravity, the filler composition 1 flows downward along the interior wall. The filler composition is introduced and discharged continuously, as is likewise known per se from distillation processes. The inner tube 12 is brought to a prescribed temperature and maintained at this by means of a heat transfer fluid 16 which circulates within the double wall (temperature regulation 17). Volatile components present in the filler composition, in particular water, are vaporized thereby, with the mass transfer in the evaporation process being relatively high because of the large surface area. The vapor formed is drawn off by means of a suitable pump 14, with the interior of the tube being maintained at a, for example, regulated pressure (pressure regulator 18) which is markedly below atmospheric pressure. The volatile substances present in the vapor can be at least partly condensed out, by which means, for example, heat of vaporization can be recovered, or it can be allowed to escape outside. If the volatile substances are condensed, the condensate, mainly water, can be discarded.

The flow through the thin film evaporator is regulated such that the filler composition remains in the evaporator (only) until the desired amount of liquid of, for example, from 3% to 10% has been removed. The amount of liquid removed can be determined by setting the interior wall temperature (for example in the range from 25° C. to 37° C.) and the working pressure (for example in the range from 0.01 mbar to 100 mbar or from 1 mbar to 100 mbar). There is a correlation between the working pressure and the interior wall temperature: the lower the vacuum, the lower the temperature may be.

The residence time in the evaporator is often in the range from 10 s to 20 minutes, preferably from 20 s to 3 minutes. The residence time or the throughputs are naturally greatly dependent on the dimensions of the respective apparatus.

The liquid-reduced filler composition 1' is introduced into the intermediate space between two transparent support elements 21, with a peripheral seal 22 being present in a manner known per se, leaving a filling opening free at at least one place. After the intermediate space has been completely filled, the peripheral seal 22 is likewise completed in a manner known per se so as to give a sealed hollow space filled with the liquid-reduced filler composition 1'.

Of course, arrangements having more than two parallel support elements can also be filled with the liquid-reduced filler composition; such arrangements are likewise known per se.

The peripheral seal between the glass plates as shown in the drawing can also be replaced by another means, for example a stuck-on tape, which in the case of fire is displaced by exiting intumescent fire protection composition.

Hardening of the filler composition 1' to form an alkali metal polysilicate can take place at room temperature or, in an accelerated fashion, in a suitable oven 31 at elevated temperature.

The spacing between the two glass plates can be of any magnitude; the same applies to the case where three, four, five or more parallel glass plates are used. The spacing is, for example, at least 1.5 mm, at least 2 mm or at least 2.5 mm. However, the process of the invention is also particularly suitable for filling relatively large intermediate spaces having a spacing of the support elements of 3 mm or more.

Instead of the thin film evaporator 11 depicted, with a heatable inner tube and with vapor drawn off in an upward direction, other apparatuses which allow a thin film evaporation process can also be used. These, too, are generally based on the principle that the starting filler composition 1 is applied in a thin layer to a wall along which it flows, preferably under the action of gravity, and liquid, including, in particular, water, is in the process evaporated and transported away.

For example, in the case of a thin film evaporator of the type depicted, the minimum pressure in the interior of the inner tube is limited to about 1 mbar. In situations in which a lower pressure is desired, a condenser which is located in the interior of the tube and brings about a further reduction in the pressure can also be used. In such an embodiment, the thin film evaporator is a short path evaporator.

Further variants of evaporators based on the thin film evaporator principle, for example ones having filler composition running downwards on the outside of a tube, with a shape of the wall which is other than cylindrical and/or with walls which are not completely vertical but instead slanted, are conceivable. For heating, too, measures other than the introduction of heat by means of a heat transfer fluid as depicted, for example direct electric heating by means of resistance elements or by means of electromagnetic induction, are conceivable.

EXAMPLE 1

A flowable, cloudy potassium silicate filler composition is mixed from a silica sol of suitable concentration and a potassium silicate water glass solution and a small proportion of about 5% by weight of glycerol as antifreeze, which filler composition can be hardened to give a polysilicate having a molar ratio of 4.7:1. The water content of the filler composition is 47%. The filler composition is subsequently applied to the interior of a thin film evaporator having an externally heated double-walled tube and spread out thinly by means of a wiper. An externally heated surface is formed. The working pressure in the evaporator is 50 mbar, and the heating jacket (inner tube) temperature is 40° C. At a throughput of 15-17 kg/h, the water content of the filler composition is reduced to 39%. The liquid-reduced filler composition is always still flowable (with a resulting viscosity of about 150 mPas at 20° C.) and cloudy and flows out at the bottom of the distillation region of the thin film evaporator. It is introduced into an intermediate space between two glass plates having a peripheral seal and a filling opening, with the spacing between the glass plates being 3 mm. The filling opening is closed. The heat protection element consisting of the glass plates with seal and the filler composition is introduced into an oven having an operating temperature of 80° C., where the filler composition hardens to give a transparent polysilicate while maintaining the reduced water content.

EXAMPLE 2

A flowable, cloudy potassium silicate filler composition is mixed from a slurry of pyrogenic silicon dioxide of suitable concentration and a potassium hydroxide solution and a small proportion of about 3% by weight of monoethylene glycol as antifreeze, which filler composition can be hardened to give a polysilicate having a molar ratio of 4.2:1. The water content of the filler composition is 45%. The filler composition is subsequently applied to the interior of a thin film evaporator having an externally heated double-walled tube and spread out thinly by means of a wiper. An externally heated surface is formed. The working pressure in the evaporator is 130 mbar, and the heating jacket (inner tube) temperature is 60° C. At a throughput of 20 kg/h, the water content of the filler composition is reduced to 37%. The liquid-reduced filler composition is always still flowable (with a resulting viscosity of about 180 mPas at 20° C.) and cloudy and flows out at the bottom of the distillation region of the thin film evaporator. It is introduced into an intermediate space between two glass plates having a peripheral seal and a filling opening, with the spacing between the glass plates being 6 mm. The filling opening is closed. The heat protection element consisting of the glass plates with seal and the filler composition is introduced into an oven having an operating temperature of 85° C., where the filler composition hardens to give a transparent polysilicate while maintaining the reduced water content.

The invention claimed is:

1. A process for producing a fire protection element, the process comprising the steps of:
   preparing an aqueous, hardenable alkali metal silicate solution with silicon dioxide nanoparticles as filler composition having a first water content;
   thin film evaporating a part of the water of the filler composition until the filler composition has a second water content which is lower than the first water content, with the filler composition being flowable at the second water content;
   introducing the filler composition having the second water content into an intermediate space between two transparent support elements;
   hardening the filler composition in the intermediate space between the support elements while maintaining the second water content.

2. The process as claimed in claim 1, wherein the step of preparing the filler composition occurs by mixing of at least one first component with a second component.

3. The process as claimed in claim 2, wherein the first component comprises silicon dioxide particles dispersed in water and the second component is an alkali metal silicate or an alkali metal hydroxide.

4. The process as claimed in claim 1, wherein the filler composition is hardenable to give a polysilicate having a molar ratio of $SiO_2:Me_2O$ in the range from 4:1 to 7:1, wherein $Me_2O$ is an alkali metal oxide where Me=K, Na, and/or Li.

5. The process as claimed in claim 1, wherein the first water content is in the range from 40% by weight to 50% by weight and the second water content is from 4% by weight to 10% by weight lower than the first water content.

6. The process as claimed in claim 1, wherein the step of thin film evaporating is carried out in a continuous process with continuous introduction of filler composition and discharge of filler composition.

7. The process as claimed in claim 6, wherein the thin film evaporation step comprises the following process substeps:
   distributing introduced filler composition across an upper side of a wall having a gradient;
   allowing the filler composition to flow along the wall effected by gravity with simultaneous removal of the evaporated water;
   discharging the filler composition which has flowed downward.

8. The process as claimed in claim 7, wherein the wall is heated and has a temperature in the range from 20° C. to 65° C.

9. The process as claimed in claim 7, wherein the space in which the water evaporates is maintained at a reduced pressure of 310 mbar or less.

10. The process as claimed in claim 1, wherein the wall forms a tube and the filler composition flows downward along the inside of the tube.

11. The process as claimed in claim 1, wherein the support elements are glass plates.

12. The process as claimed in claim 11, wherein at least one of the glass plates is toughened.

13. The process as claimed in claim 11, wherein at least one of the glass plates is coated.

* * * * *